United States Patent
Smith et al.

(10) Patent No.: US 7,925,433 B2
(45) Date of Patent: Apr. 12, 2011

(54) METHOD, SYSTEM AND DEVICE FOR MONITORING VEHICLE USAGE

(75) Inventors: Brian Smith, Aliso Viejo, CA (US); Eric Schafer, Carlsbad, CA (US)

(73) Assignee: Signature Control Systems, Inc., Irvine, CA (US)

( * ) Notice: Subject to any disclaimer, the term of this patent is extended or adjusted under 35 U.S.C. 154(b) by 0 days.

(21) Appl. No.: 12/153,034

(22) Filed: May 13, 2008

(65) Prior Publication Data

US 2008/0258939 A1 Oct. 23, 2008

Related U.S. Application Data

(62) Division of application No. 11/392,735, filed on Mar. 30, 2006, now Pat. No. 7,660,652.

(60) Provisional application No. 60/764,321, filed on Feb. 2, 2006.

(51) Int. Cl.
*G01S 5/00* (2006.01)

(52) U.S. Cl. ....... 701/207; 701/214; 701/35; 455/456.1; 340/988; 340/991

(58) Field of Classification Search ........... 701/35, 701/213, 207, 214, 211; 340/438, 988, 991; 455/456.1, 421; *G01S 5/00*
See application file for complete search history.

(56) References Cited

U.S. PATENT DOCUMENTS

| 5,129,605 | A | | 7/1992 | Burns et al. |
|---|---|---|---|---|
| 5,173,856 | A | | 12/1992 | Purnell et al. |
| 5,685,786 | A | * | 11/1997 | Dudley ............... 473/407 |
| 5,805,079 | A | | 9/1998 | Lemelson |
| 5,844,473 | A | | 12/1998 | Kaman |
| 5,848,381 | A | | 12/1998 | Ishii et al. |
| 5,986,543 | A | | 11/1999 | Johnson |
| 6,114,993 | A | * | 9/2000 | Henderson et al. ...... 342/357.27 |
| 6,212,393 | B1 | * | 4/2001 | Suarez et al. .............. 455/456.4 |
| 6,240,365 | B1 | | 5/2001 | Bunn |
| 6,314,308 | B1 | | 11/2001 | Sheynblat et al. |
| 6,496,775 | B2 | | 12/2002 | McDonald, Jr. et al. |
| 6,556,905 | B1 | | 4/2003 | Mittelsteadt et al. |
| 6,611,755 | B1 | | 8/2003 | Coffee et al. |
| 6,629,030 | B2 | | 9/2003 | Klausner et al. |
| 6,691,007 | B2 | | 2/2004 | Haugse et al. |
| 6,816,761 | B2 | * | 11/2004 | Denton ........................ 701/35 |
| 6,832,140 | B2 | * | 12/2004 | Fan et al. ...................... 701/33 |

(Continued)

OTHER PUBLICATIONS

"Shadow Tracker™ Professional Software—Complete Vehicle Tracking Report", Printed Jan. 18, 2006.

(Continued)

*Primary Examiner* — Tuan C To
(74) *Attorney, Agent, or Firm* — Posz Law Group, PLC

(57) ABSTRACT

A vehicle tracking device (101), method and/or system are provided. The device (101) includes a location interface (117), for receiving a location signal indicating a current location when operably connected to a GPS antenna; a sensor interface (109), for receiving sensor signals from sensors in the vehicle indicating a sensed status of the vehicle, when electrically or electronically connected to the sensors; and a processor (105). The processor (105) is configured to facilitate receiving, from the location interface, indications of a current location; determining, responsive to the location signal, a determined current location of the vehicle (127); receiving, from the sensor interface, a sensed status of the vehicle (129); recording a pre-defined event condition, when the pre-defined event condition occurs (131) responsive to the sensed status, in a vehicle history; and recording the determined current location in the vehicle history (133).

10 Claims, 7 Drawing Sheets

U.S. PATENT DOCUMENTS

| | | | |
|---|---|---|---|
| 6,865,457 B1 | 3/2005 | Mittelsteadt et al. | |
| 6,931,309 B2 | 8/2005 | Phelan et al. | |
| 6,943,699 B2 | 9/2005 | Ziarno | |
| 6,947,816 B2 | 9/2005 | Chen | |
| 6,972,667 B2 * | 12/2005 | Flick | 340/426.18 |
| 6,985,803 B2 | 1/2006 | Abdel-Malek et al. | |
| 7,113,127 B1 | 9/2006 | Banet et al. | |
| 7,788,027 B2 * | 8/2010 | Jones | 701/207 |
| 7,821,421 B2 * | 10/2010 | Tamir et al. | 340/901 |
| 2003/0038712 A1 | 2/2003 | Pelletier | |
| 2003/0098784 A1 * | 5/2003 | Van Bosch et al. | 340/425.5 |
| 2003/0125854 A1 * | 7/2003 | Kawasaki et al. | 701/35 |
| 2003/0154009 A1 | 8/2003 | Basir et al. | |
| 2003/0182033 A1 | 9/2003 | Underdahl et al. | |
| 2003/0233176 A1 * | 12/2003 | Cerchione et al. | 701/21 |
| 2004/0015419 A1 * | 1/2004 | Ehrman et al. | 705/28 |
| 2004/0260467 A1 * | 12/2004 | Wehrlen et al. | 701/213 |
| 2005/0128068 A1 * | 6/2005 | Winick et al. | 340/517 |

OTHER PUBLICATIONS

International Search Report dated Sep. 20, 2007 issued in corresponding application No. PCT/US07/02747.

Office Action dated Mar. 20, 2009 in corresponding parent U.S. Appl. No. 11/392,735.

Office Action dated Jul. 31, 2008 in corresponding U.S. Appl. No. 11/392,735.

Written Opinion of the International Preliminary Examining Authority mailed on Jul. 6, 2009 issued in corresponding PCT international application No. PCT/US07/02747.

International Preliminary Report on Patentability and Written Opinion of the International Searching Authority mailed on Mar. 11, 2010 in connection with corresponding PCT application No. PCT/US07/02747, which corresponds to related U.S. Appl. No. 11/392,735.

* cited by examiner

METHOD, SYSTEM AND DEVICE FOR MONITORING VEHICLE USAGE

CROSS REFERENCE TO RELATED APPLICATIONS

This application is a divisional application of U.S. application Ser. No. 11/392,735, which was filed on Mar. 30, 2006, claims priority to provisional application Ser. No. 60/764,321, filed Feb. 2, 2006, which is expressly incorporated herein by reference.

BACKGROUND OF THE INVENTION

1. Field of the Invention

The present invention relates to systems for tracking a motorized vehicle. More particularly, the present invention relates to a portable device for monitoring the vehicle.

2. Description of the Related Art

Companies that require vehicles to run their businesses must carefully manage the use and maintenance of the vehicles in order to get the most out of their investment. For example, they want to avoid running the vehicles outside of the manufacturer's specifications and also ensure proper and timely servicing. Without diligent care, costly repair and/or replacement costs can be incurred.

This can be particularly true when a fleet of vehicles is involved. Because the vehicles typically are not in the hands of the people managing the company's bottom line, it can difficult to make sure this is achieved.

BRIEF DESCRIPTION OF THE SEVERAL VIEWS OF THE DRAWING(S)

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION OF THE INVENTION

Figure 1:
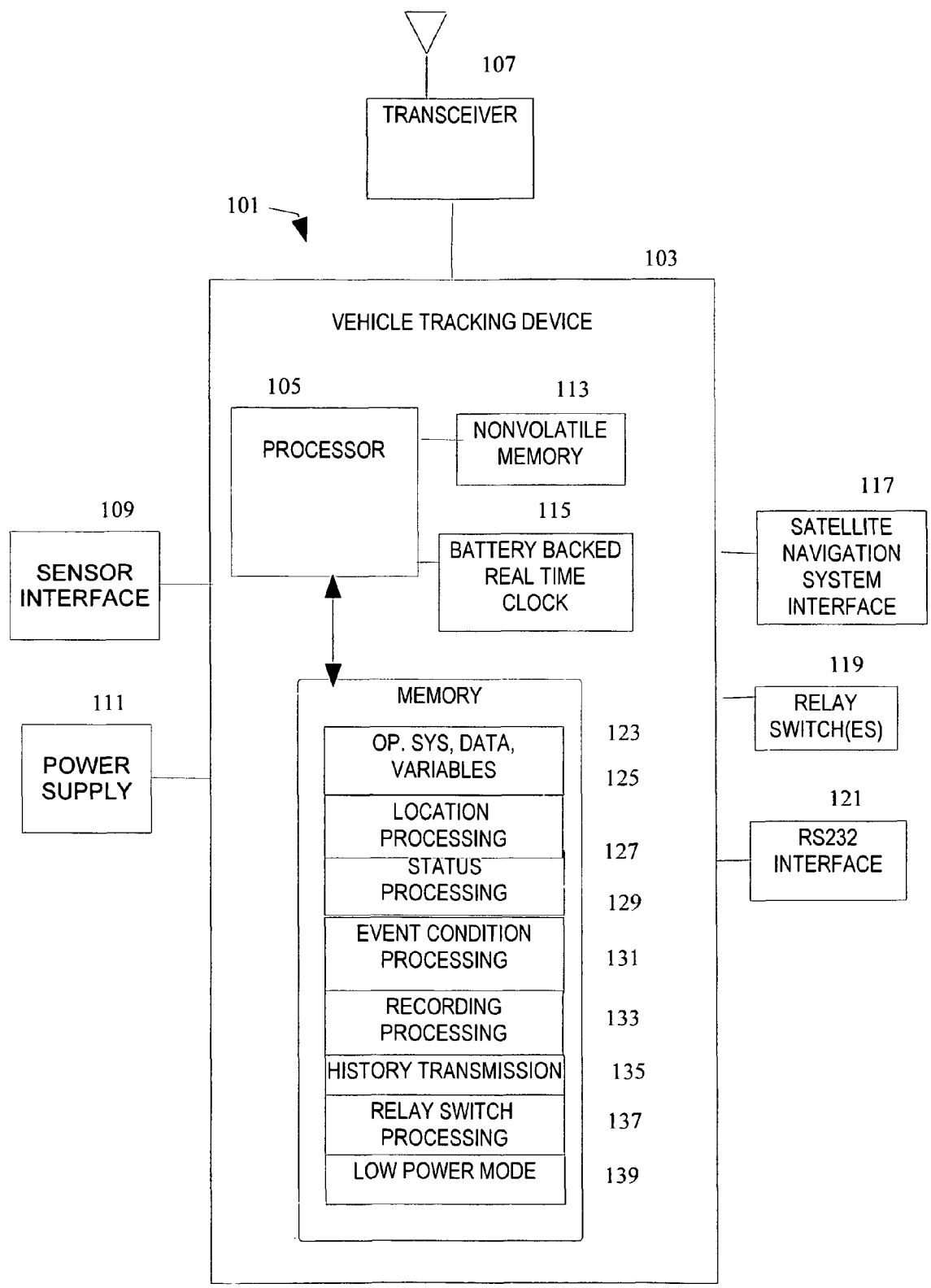
FIG. 1 is a block diagram illustrating portions of an exemplary vehicle tracking device in accordance with various embodiments.

In overview, the present disclosure concerns portable tracking devices, sometimes referred to as monitoring devices or telemetry devices, having the capability of sensing various conditions of a vehicle. These tracking devices may be installed in a motorized vehicle and may be electrically connected to various conventional sensors, relays and/or the like that can be provided in motorized vehicles. The vehicle tracking devices may be incorporated into and communicate in accordance with a system and/or method, which can provide an overall monitoring of the vehicle tracking devices.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; that is, processes or steps that are not so limited may be performed in any order.

Much of the inventive functionality and many of the inventive principles when implemented, are best supported with or in software and/or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to manage the use and maintenance of the vehicles. The vehicle tracking device, system and/or method can be used by any company that manages vehicles, including for example the vehicle owners, the direct users and the vehicle lessors. Examples of direct users include golf course managers (which manage, for example, golf carts, mowers, and maintenance trucks), city maintenance managers (which manage, for example, maintenance trucks, motorcycles, lawn mowers, snow removal vehicles, and the like), delivery services (which manage delivery vehicles) and similar operations with various motorized vehicles. Leasing companies can use the product to ensure proper care and maintenance of their assets by the lessees. Moreover, a desired geographic relation between motorized vehicles can be controlled in relation to a proceeding (for example, spacing of golf carts during a golf game, or spacing of lawn mowers during maintenance operations, spacing of snow removal vehicles during snow removal), alone or in combination with a layout of where the proceeding occurs.

Continuous tracking and recording of the vehicles use (for example, speed, location, and the like) and status (for example, oil pressure, engine run-hour meter, and/or similar) can be helpful. One or more embodiments described herein include a vehicle tracking device, which can be mounted to the vehicle, and/or a host computer for data logging and/or review of tracked data and optionally for control of the motorized vehicle.

Further in accordance with exemplary embodiments, there is provided a vehicle tracking device designed to address the need for continuous tracking and recording of a vehicle's use (for example, speed, location, and/or the like) and/or status (oil pressure, engine run-hour meter, and/or similar). A vehicle tracking device, which can be provided as unitary module, can be mounted to and optionally removed from the vehicle. The vehicle tracking device can be connected via interfaces to various elements in the vehicle. The various elements can include one or more of the following, which are provided by way of example:

Sensors (for example, oil pressure, hydraulic fluid, air pressure, ignition switch, etc) conventionally provided in the automobile for which monitoring is desired. Sensor interfaces can include voltage sources, switches, and linear outputs.

Circuits conventionally provided in the automobile, where the circuits can be routed through relays in the vehicle tracking device. This can allow the vehicle tracking device to switch the circuits, such as an alarm lamp or ignition disable, ON or OFF.

Power from the vehicle battery.

Satellite navigation system antenna (for example, GPS antenna) for locating the vehicle and determining its velocity and heading.

Radio antenna for remote access to data stored by the vehicle tracking device.

Referring now to FIG. 1, a block diagram illustrating portions of an exemplary vehicle tracking device in accordance with various embodiments will be discussed and described. The vehicle tracking device 101 may include a satellite navigation system interface 117, together with a transceiver 107 and/or a computer port interface (represented by RS232 interface 121). The transceiver 107 alternatively can be provided as a transmitter and/or a receiver. Alternative embodiments can include one or more of the following: a sensor interface 109, a connection to a power supply 111, and/or relay switches 119. The vehicle tracking device 101 as depicted generally includes a processor 105, and a memory 123, and may include other functionality not illustrated for the sake of simplicity. The vehicle tracking device may include a non-volatile memory 113 which can be coupled to the processor, and/or a battery backed real time clock 115 which can be coupled to the processor.

The processor 105 may comprise one or more microprocessors and/or one or more digital signal processors. The memory 123 may be coupled to the processor 105 and may comprise a read-only memory (ROM), a random-access memory (RAM), a programmable ROM (PROM), and/or an electrically erasable read-only memory (EEPROM). The memory 123 may include multiple memory locations for storing, among other things, an operating system, data and variables 125 for programs executed by the processor 105; computer programs for causing the processor to operate in connection with various functions such as location processing 127, status processing 129, event condition processing 131, recording processing 133, history transmission 135, relay switch processing 137, low power mode functionality 139, and/or other processing (not illustrated); and storage (not illustrated) for other information used by the processor 105 such as configurations, lists, temporary variables and counters. The computer programs may be stored, for example, in ROM or PROM and may direct the processor 105 in controlling the operation of the vehicle tracking device 105. Additional details on the illustrated functional blocks of FIG. 1 are provided below.

Accordingly, one or more embodiments provides a portable telemetry/tracking device suitable for use with a motorized vehicle, the motorized vehicle including sensors for sensing and indicating vehicle status, the device comprising: a location interface, for receiving a location signal indicating a current location when operably connected to a GPS antenna; a sensor interface, for receiving sensor signals from sensors in the vehicle indicating a sensed status of the vehicle, when electrically or electronically connected to the sensors; and a processor cooperatively operable with the location interface and the sensor interface. The processor 105, for example, a microprocessor, can communicate with the illustrated functional blocks within the vehicle tracking device 103 and can perform the programmed tasks.

The vehicle tracking device 101 conveniently can be configured to receive power from a power supply 111, for example a vehicle battery of the motorized vehicle in which it is installed. The input range can vary from 10-60VDC to accommodate the wide range of voltages used for batteries of different vehicles. One or more embodiments can accommodate voltage which can be regulated separately in first and second sections: the first section can include functions that require continuous power, and the second section can include functions that can be turned OFF during periods of inactivity to preserve battery life (also referred to as Sleep Mode). For example, the second section that is powered off during Sleep Mode can include the transceiver 107, the sensor interface 109, the satellite navigation system interface 117, the relay switches 119, and/or the RS232 interface 121. Techniques for providing a Sleep Mode are known and can be utilized in connection with the vehicle tracking device referring to the description provided herein.

The battery backed real time clock 115 can be provided as a circuit, for example. The battery backed real time clock 115 can be used to maintain time, even when the vehicle tracking device is powered OFF. The clock can be read and written via commands. An alternative provides that the clock can have "GPS Sync" enabled, which can synchronize the vehicle tracking device 101 to the time received in accordance with the satellite navigation system interface 117. An offset (in hours) may be required to set local time, because GPS time is based on UTC (coordinated universal time) (Greenwich, England).

The vehicle tracking device 101 can be provided with a transceiver 107, and more particularly one or more alternatives provides the vehicle tracking device integrated with a radio transceiver. The transceiver 107 can be, for example, a digital cellular radio, provided for connection to a remote host computer such as through the Internet and/or cellular network; and/or a short range radio, such as a line of sight license free spread spectrum radio or the like.

Accordingly to alternative embodiments, the spread spectrum radio can be configured to fixed channel or roaming mode, in accordance with known techniques. In a large installation where a single radio at the host computer does not have enough range, repeater units can be used to increase a service area. However, this means that different channels can be used so that the frequency hop sequence generated by the host computer does not overlap. The vehicle tracking device 101 can be configured to "roam" available channels until a link is established by utilization of such techniques. When a link is found, the vehicle tracking device 101 can continue to communicate on that channel until the link is lost. When the link is lost, the vehicle tracking device 101 can scroll through a list of available channels (also referred to as a roaming list), which may be stored locally, until a new link is found. In operation, the vehicle tracking device 101 can conveniently store as many as 16 channels in its roaming list; alternative embodiments can provide different number of channels in the roaming list. The roaming capability can be set via commands in accordance with known techniques. Further alternatives can be provided, for example, a service area can be extended utilizing spread spectrum radios incorporating repeater functions.

The vehicle tracking device 101 can include a computer port interface, for example a removable local connection, including a serial or parallel data connection, such as the illustrated RS232 communications interface 121 and/or a USB interface, which can be a low cost alternative for communicating with the vehicle tracking device. The illustrated RS232 interface, for example, allows an interface cable (9 pin) to be connected between the vehicle tracking device 101 and the host computer, and the processor 105 can communicate over the RS232 interface 121. Accordingly, one or more embodiments provide a computer port interface, more particularly a serial data port, and even more particularly a RS232 port, for transmitting communications when operably connected to a computer communication network; wherein the processor is further configured to facilitate transmitting, over the computer port interface, communications including the vehicle history.

The vehicle tracking device 101 can include a sensor interface 109, to interface with one or more sensors. The sensors can be of various types. In one realization, the vehicle tracking device 101 interfaces eight sensors of possibly varying interface type: linear sensors, ON/OFF voltage sensors, and/or contact closure sensors. Accordingly, the vehicle tracking device 101 can include the sensor interface 109 for receiving input from the sensors. One or more alternative realizations of the vehicle tracking device 101 provide sensors together with the sensor interface 109.

The vehicle tracking device 101 can utilize independent timers to track vehicle functions. An appropriate number of independent timers in accordance with one or more embodiments is five. These timers can use sensor states provided from the sensor interface 109 as inputs, and can have an accumulator (for example, a 32 bit accumulator) to count time, such as seconds when an input function of the sensor state(s) evaluates to true. The input function can include one of various states (binary, ternary, or multi-state) for the sensors. In one realization, the input function is ternary, that is, it is one of three states for each of the sensors: Active, Inactive, or Don't Care. A combination of the states can be evaluated to provide the input function. Accordingly, one or more embodiments provide at least one timer, wherein the pre-defined event condition is timed in connection with the at least one timer, and the time and associated event condition are recorded in the vehicle history.

The timer accumulators can be configured to reset to zero, for example when their input function=false, or maintain the count for example until the function=true again. In one realization, a specific timer such as Timer 1 can be defaulted to be used as the "Run Hour Meter" which can accumulate when Sensor 1 is active (All other sensor inputs=Don't Care). The specific timer such as Timer 1 can be saved to the non-volatile memory 113, for example provided in the battery backed real time clock 115 or FLASH memory, so it can be preserved when power is disconnected. Configuration of the timer accumulators and current state of the sensors associated therewith can be read/written via commands.

The vehicle tracking device 101 can record events when specific conditions are detected as being met. An event condition representing the event can be stored, for example in non-volatile memory, where the event condition includes some or all of the following information, which is provided by way of example: Event Type, Timer or Sensor # relevant to the event type, Date and/or Time, Current State of all Sensors (if desired), Timer Configuration (if applicable), Timer Value (if applicable), GPS Position Data, Run-hr meter value (Timer 1 value), and/or Accumulated Distance.

An event can be prioritized, for example as either Priority 1 or Priority 2, which may indicate for example an urgency or the order of handling to be associated with event.

The event types can be indicated, for example, in a table stored separately in memory. The following Table 1 lists various event types that can be utilized, and are provided by way of example to illustrate the range of event types.

TABLE 1

| Event | Description |
| --- | --- |
| Sensor_Active | Sensor transitioned to the active state |
| Sensor_Inactive | Sensor transitioned to the inactive state |
| Timer_Active | Timer truth table evaluates to true |
| Timer_Inactive | Timer truth table evaluates to false |
| Power_Lost | Main DC power has been disconnected |
| Power_Restored | Main DC power has been applied |
| Sleep_Mode_Active | Device has transitioned to low power mode |
| Sleep_Mode_Inactive | Device has transitioned from low power to full power mode |
| GPS_Fix | GPS Fix has been established |
| No_GPS_Fix | GPS Fix has been lost |
| RF_Link | RF link with server has been established |
| No_RF_Link | RF link with server has been lost |
| Timer_Expired | Timer counter has reached programmed threshold |

The specific conditions that are met to cause a predefined event condition may include one or more of the following: a selected event type, a combination or series of selected event types, a sensor state, a combination of sensor states, a timer value, a particular GPS position data, a threshold or specified run hr-meter value, and/or a threshold or specified accumulated distance, alone or in combination; alternatively in combination with date and/or time.

One or more embodiments provide that when a new event occurs or when a predefined event condition occurs, a message can be transmitted in accordance with the transceiver 107 to the host computer indicating that the new event occurred, and/or including the event condition information. The transmission of the new event message can be enabled/disabled, for example by event priority. The message period (how often it is transmitted) associated with the new event can be specified as well as a timeout value. Accordingly, one or more embodiments provide that the new event message can be repeatedly transmitted until the host computer responds or until the timeout value is reached. Alternatively, the host computer can periodically retrieve stored information regarding the events from the vehicle tracking device 101 in accordance with the transceiver 107 and/or the computer port interface. Event configuration (for example priority, message period, event types, and/or specific conditions to cause events) and/or reading of event conditions can be performed via commands.

The vehicle tracking device 101 can incorporate relay switches 119. In one realization, for example, two relay switches 119 are provided in the vehicle tracking device 101 to allow the unit to turn ON or OFF the vehicle circuits to which they are connected. The relay switches 119 can be programmed to activate automatically in response to an event which was previously specified, and/or can be controlled remotely, for example by commands which can be received by the vehicle tracking device 101 from the host computer. The relay switches 119 can be manually connected to desired circuits of the vehicle.

The vehicle tracking device 101 can receive new and/or updated satellite navigation system data (for example, GPS data) periodically in accordance with the satellite navigation system interface 117 (also referred to herein as a location interface), for example once a second while the satellite navigation system has established a satellite fix. The data can be received as records. The vehicle tracking device 101 can divide up the records into package types, which can conveniently be provided as three different package types. In the following example, the package types which are utilized by the vehicle tracking device 101 can be selected based on the communication bandwidth and memory available: minimum record, normal record, and extended record. The satellite navigation system can be, for example, a GPS antenna. Accordingly, one or more embodiments provides for a GPS antenna, operably connected to the location interface.

A package type denominated as a "minimum record" can contain fix status and coordinate data, and can be accommodated in a record having a length of eight bytes. A package type denominated as a "normal record" can include the information in the minimum record plus the Timer 1 (Run-hr meter) accumulator value and the distance traveled accumulator. The normal record can be accommodated in a record having a length of 16 bytes. A package type denominated as "extended record" can include the information in the normal record plus additional information provided by the satellite navigation system, for example the time and/or date of fix, a velocity, an altitude above sea level, and/or an estimated position error. The extended record can be accommodated in a record having a length of 32 bytes.

The records can be made available from a conventional GPS, for example, in real time via a command in accordance with definitions provided by the GPS manufacturer. Moreover, the records received in accordance with the satellite navigation system interface 117 can be saved to memory such as the nonvolatile memory 113, as discussed for example below. The period (how often the record is saved), package types, package lengths, and/or associated memory can be configured via a command. The memory, for example the nonvolatile memory 113, can be configured so that after the memory is full, old data is over-written, starting from the oldest record. In the example discussed herein, the different package types have different sizes and consequently require different amounts of memory. Therefore, selecting normal records rather than extended records can double the length of time a vehicle can be tracked.

The vehicle tracking device can be equipped with a nonvolatile memory 113, such as a solid state storage memory device, for example a non-volatile FLASH memory chip (conventionally available in densities from 2-64 Mbit) or the like. An example usage of the nonvolatile memory 113 is discussed below in more detail in connection with FIG. 2.

The processor 105 can provide location processing 127. For example, the processor can receive indications of the current location of the vehicle from the satellite navigation system interface 117. The indications received may also indicate velocity, heading, and/or other information which can be provided by the satellite navigation system interface 117. Based on the indications, and in accordance with known techniques the current location of the vehicle (in which the vehicle tracking device 101 is installed) can be determined, and optionally other information such as velocity and/or heading can be determined or provided by the satellite navigation system interface 117. Accordingly, one or more embodiments provide that the processor is further configured to facilitate receiving, from the transceiver, a request for current vehicle information; and responsive to the request for current vehicle information, transmitting the determined current location and the sensed status over the transceiver.

The processor 105 can provide status processing 129, whereby the processor 105 receives the sensed status, for example from the sensor interface 109. The sensed status from the sensor interface 109 can be further processed, if desired, in accordance with analog-to-digital processing or similar.

The processor 105 can provide event condition processing 131. Event condition processing has been described in detail above.

The processor 105 can provide recording processing 133, whereby various information can be recorded, for example in the nonvolatile memory 133 or other local memory. Information that can be recorded includes, for example, data received from the satellite navigation system interface 117 (which can be transformed into desired record formats, such as the package types discussed above, prior to recording), event conditions, sensor states, and the like. The information that is recorded, and portions thereof, is sometimes referred to herein as a history. Selective portions of the information can be recorded, if desired.

The processor 105 can provide history transmission 135, for transmitting the history (or portion(s) thereof), for example to a host computer for further processing. Accordingly, the history (or desired portion thereof) can be retrieved from the memory, for example the illustrated nonvolatile memory 113; formatted for transmission, and transmitted in accordance with the transceiver 107 and/or the computer port interface. The transmission of the history can be initiated by a request for the history (received over the transceiver 107 and/or the computer port interface), or can be initiated automatically by the vehicle tracking device 101, for example periodically or in response to particular event conditions. Accordingly, one or more embodiments can provide that the processor is further configured to facilitate receiving, from the transceiver, a request for vehicle history, and responsive to the request for vehicle history, transmitting at least a portion of the vehicle history over the transceiver. Further, accordingly, one or more embodiments can provide a computer port interface, such as an RS232 port, for transmitting communications when operably connected to a computer communication network; wherein the processor is further configured to facilitate transmitting, over the computer port interface, communications to send the vehicle history.

Furthermore, one or more embodiments provides that the processor is configured to facilitate first receiving, from the location interface, indications of a current location; determining, responsive to the location signal, a determined current location of the vehicle (and optionally, a velocity of the vehicle, and a heading of the vehicle); second receiving, from the sensor interface, a sensed status of the vehicle; first recording a pre-defined event condition, when the pre-defined event condition occurs responsive to the sensed status, in a vehicle history; and second recording the determined current location (and optionally the velocity and the heading) in the vehicle history. According to one or more embodiments, the second recording occurs at a pre-determined interval, for example a user-defined number of seconds, minutes, hours and/or days, and the pre-determined interval can be changed manually or semi-manually. Moreover, according to one or more alternate embodiments, the processor is configured to indicate the occurrence of a pre-defined event condition response to a combination of the sensed status and a pre-determined sensor state.

The processor 105 can provide relay switch processing 137, for example when the vehicle tracking device 101 receives a communication in accordance with the transceiver 107 or the computer port interface instructing that a relay switch is to be switched. The processor 105 can provide the appropriate indications to the relay switches interface 119 in order to effectuate the switching instructed in the communication. Accordingly, one or more embodiments provide that the processor is further configured to facilitate receiving, in accordance with the transceiver, a communication with an indication that the at least one relay switch is to be switched; and responsive to the indication, switching the at least one relay switch.

The processor 105 can provide low power mode functionality 139. In this embodiment, the processor 105 can instruct the power supply 111 to switch to low power mode. Low power mode can be initiated, for example, when a period of time has lapsed without a communication from the transceiver 107 and/or the computer port interface, and/or without receiving a change in location from the satellite navigation system interface 117, and/or upon occurrence of a selected event condition, and/or in various other desired scenarios. Accordingly, one or more embodiments provide that the processor is further configured to facilitate transitioning the device to a low power mode after a pre-determined period of inactivity of the transceiver.

The vehicle tracking device 101 conveniently can be provided in a housing 103. The satellite navigation system interface 117, the sensor interface 109, and/or the processor 105 can be located in the housing. Other functional components that may be included can be provided in the housing 103. By providing the vehicle tracking device 101 in a housing 103, the vehicle tracking device 101 conveniently can be removed from the vehicle, and can be re-installed in the same vehicle or a different vehicle. Accordingly, one or more embodiments provide that the vehicle tracking device includes a housing, and that the location interface, the sensor interface, and the processor are located in the housing, whereby the device can be removed from the vehicle.

Figure 2:
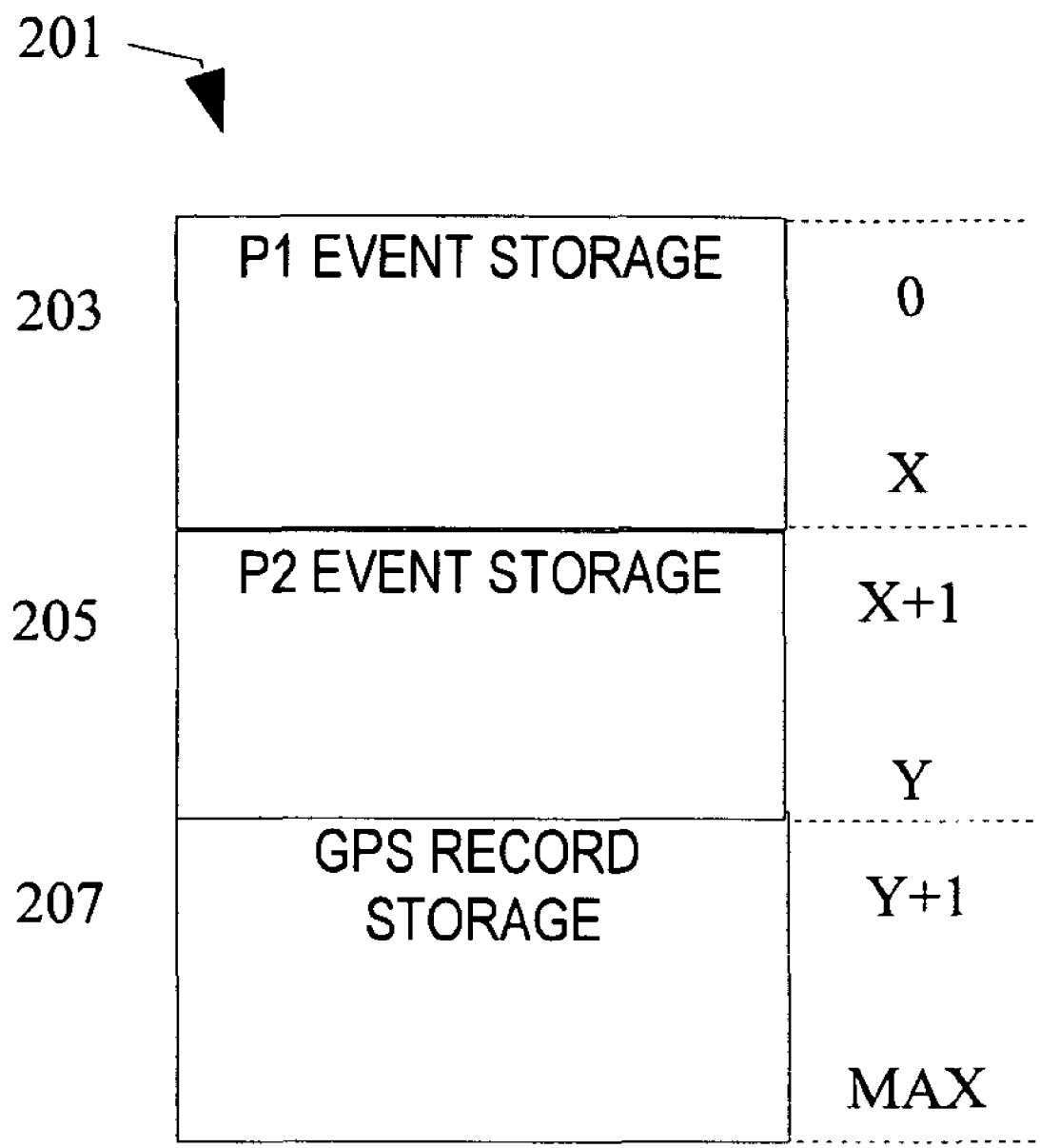
FIG. 2 is a block diagram illustrating a memory in accordance with various embodiments.

Referring now to FIG. 2, a block diagram illustrating a memory 201 in accordance with various embodiments will be discussed and described. The memory 201 can be used to store events and satellite navigation system records and related information. An allocation of memory in the memory device can be defined, for example how much storage space is used for various events and/or records, such as priority 1 events, priority 2 events, and satellite navigation system records. The memory device can be partitioned, as for example illustrated in the memory map of FIG. 2 illustrating a FLASH memory chip.

The memory can be divided into pages, with the page length depending on the memory capacity:

2 Mbit, 4 Mbit, 8 Mbit: 264 bytes/page
16 Mbit, 32 Mbit: 528 bytes/page
64 Mbit: 1056 bytes/page In the illustrated example, each of the three memory partitions can sit on page boundaries. Consider an example where each event requires 33 bytes of storage; therefore memory usage is optimal when the number of events is set to a multiple of the bytes/page divided by 33. For example, for a 2 Mbit device, the number of events should be a multiple of 264/33=8.

Satellite navigation system records also can be stored in pages. According to one or more embodiments, these records can have a variable length, depending on the mode used. In addition, each 256 bytes of conventional GPS records can be preceded by an 8 byte header, thus yielding the optimal 264 byte page. The GPS recording capacity of the memory in the memory device can be calculated by determining the number of GPS record pages available, the number of records per page, and the programmed save interval.

In FIG. 2, the memory 201 is divided into priority 1 (P1) event storage 203, priority 2 (P2) event storage 205, and GPS record storage 207. Consider the following example application:

Memory=2 Mbit (1024 pages @ 264 bytes/page)
P1 Events=160 (uses [160*33]/264=20 pages)
P2 Events=240 (uses [240*33]/264=30 pages)
GPS Memory Mode=Normal (16 byte length)
GPS Memory Save Interval=60 seconds Based on this application, we calculate the records/page (excludes header)=256/16=16 records/page. Thus, $$\text{Total available GPS record capacity} = (1024-20-30 \text{ pages})*16 \text{ records/page} = 15584 \text{ records} \quad (1)$$

Next, $$\text{Total recording time of the GPS partition} = 15584 \text{ records} * 60 \text{ seconds} = 10 \text{ days, 19 hours, 44 minutes} \quad (2)$$

In this example, the default setting is 160 events for both priority 1 and 2, and the GPS record type is normal with a 5 second save interval.

One or more embodiments can be used in one or more of multiple modes, and optionally can be selected depending on the user's preferences. Such modes can include, by way of example, real time monitoring, short term vehicle history recording, and/or long term vehicle history recording. An illustrative example is provided of these modes below.

Real Time Monitoring: by incorporating a wireless transceiver as part of a wireless network (Local or Wide Area Cellular), a remote host computer can interrogate the vehicle tracking device in real time, for example, to determine its location, and/or to read the state of the sensors or alarm conditions, and/or to switch the relays. For example, a golf course manager may need to determine the current location of their customers' golf carts continuously to properly regulate the pace of the game. When operating in this mode, storing a history in the memory 201 can be optional.

Short Term Vehicle History Recording: the vehicle tracking device can be used with a low cost, short range radio transceiver such as when periodic (such as daily or weekly) vehicle checks are desired. The vehicle tracking device can incorporate memory 201, such as a non-volatile memory, to record various vehicle parameters including satellite navigation system (such GPS) positions at user specified intervals and records of predefined event conditions. The short term vehicle history recording mode may be useful for a delivery company that wants to automate their vehicle maintenance checks. As the vehicle returns to the company lot after a work day, the vehicle tracking device can automatically link with an office PC to download the miles driven, a "snail's trail" of the vehicle's location throughout the day, and any engine alarms that may have occurred. The host computer can be used for further processing, for example to determine if any servicing is required, and to issue a work order to initiate the servicing.

Long Term Vehicle History Recording: because the vehicle tracking device can have programmable record intervals, it is suitable for use in long term recording applications as well. The vehicle tracking device can be used without a radio transceiver to reduce cost, for example when only long term (such as at least quarterly or annually) vehicle checks are required. The long term vehicle history recording mode may be useful for a leasing company that wants to know how the vehicle was used and maintained while it was in the hands of the lessee over an extended period of time. The vehicle tracking device can be removed from the vehicle upon return, and connected via a local data interface (such as an RS232 cable) to the host computer for data downloading and subsequent processing and/or review. If desired, the memory 201 of the vehicle tracking device which stored the history can then be cleared and the vehicle tracking device can be re-installed, including on another vehicle.

Accordingly, one or more embodiments provide a non-volatile memory operably communicating with the processor, the vehicle history being stored in the non-volatile memory.

Figure 3:
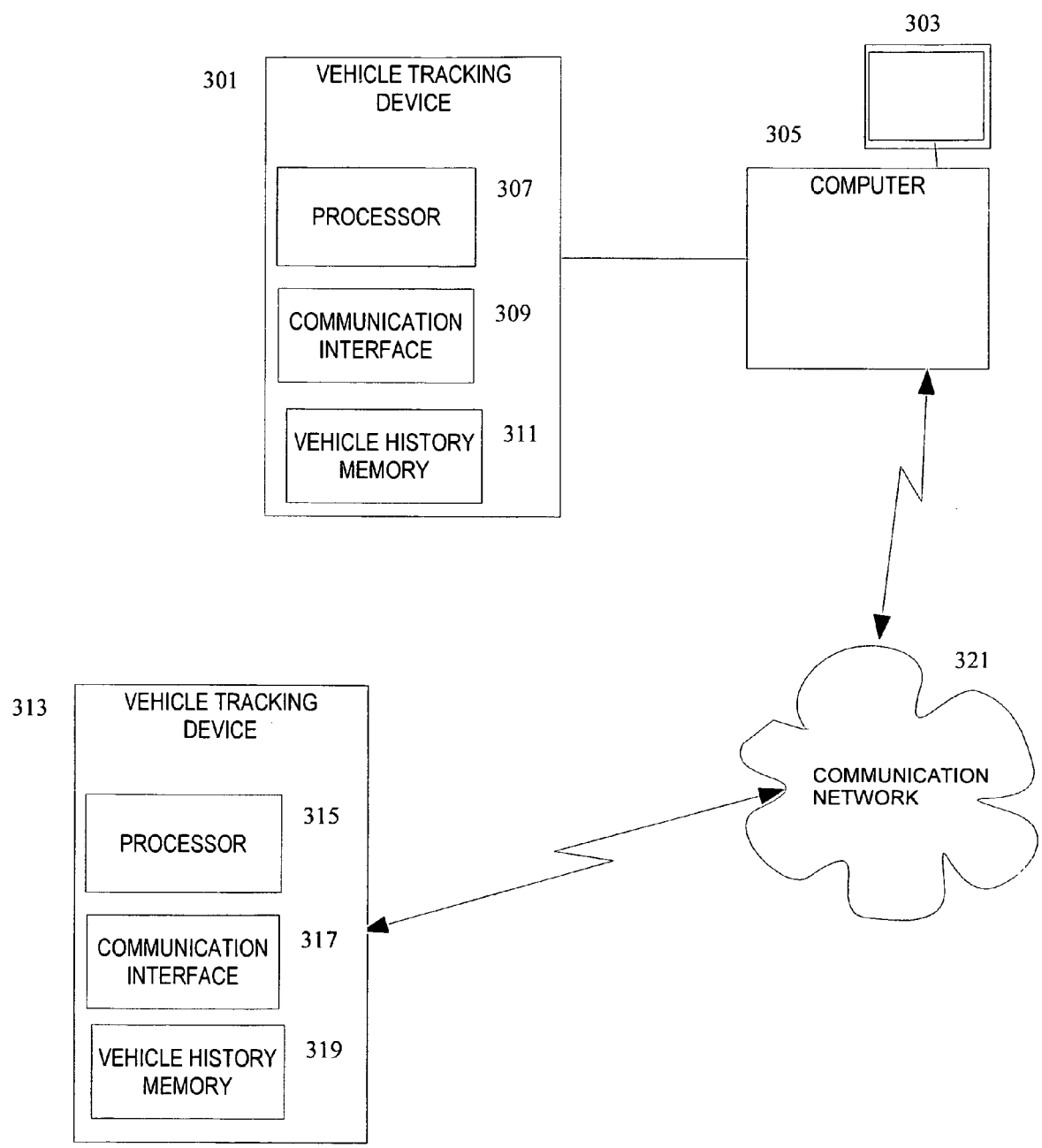
FIG. 3 is a diagram illustrating a simplified and representative environment associated with vehicle tracking devices and a host computer in accordance with various embodiments.

Referring now to FIG. 3 is a diagram illustrating a simplified and representative environment associated with vehicle tracking devices 301, 313 and a host computer 305 in accordance with various embodiments will be discussed and described. The two vehicle tracking devices 301, 313 which are illustrated are representative of any number of vehicle tracking devices which can be utilized in a vehicle tracking system. Also, the one host computer 305 which is illustrated is representative of any number of host computers which can be utilized, for example, in a distributed processing arrangement.

The vehicle tracking devices 301, 313 can include a processor 307, 315, a communication interface 309, 317, and a vehicle history memory 311, 319, all as discussed herein in more detail. The host computer 305 optionally can include a user interface, here represented by the display 303.

The first vehicle tracking device 301 can establish a direct connection for communication with the host computer 305 in accordance with the communication interface 309, in this example a computer port interface. This can be convenient for establishing a local connection between the host computer 305 and the vehicle tracking device 301.

The second vehicle tracking device 313 is illustrated to provide an example of remote communication with the host computer 305 in accordance with the communication interface 317, which in this example is a transceiver. The transceiver communicates over a communication network 321, as described elsewhere herein. Accordingly, one or more embodiments provides for a transceiver, for at least one of receiving and transmitting communications when operably connected to a communication network. Further, one or more embodiments provides for a transceiver, for at least one of receiving and transmitting communications when operably connected to a wireless communication network. The use of a transceiver on the vehicle tracking device 313 can be convenient for establishing the remote connection between the host computer 305 and the vehicle tracking device 313. Although the illustrated vehicle tracking devices 301, 313 utilize separate local and remote communication capability, one or more embodiments can provide that the vehicle tracking device includes both local and remote communication capability.

The user interface 303 provided on the host computer 305 can be utilized for example, to display reports of vehicle histories, to provide one or more alarms relating to vehicle status, and/or to interact with a user to initiate communications to the vehicle tracking device(s) 301, 313.

Figure 4:
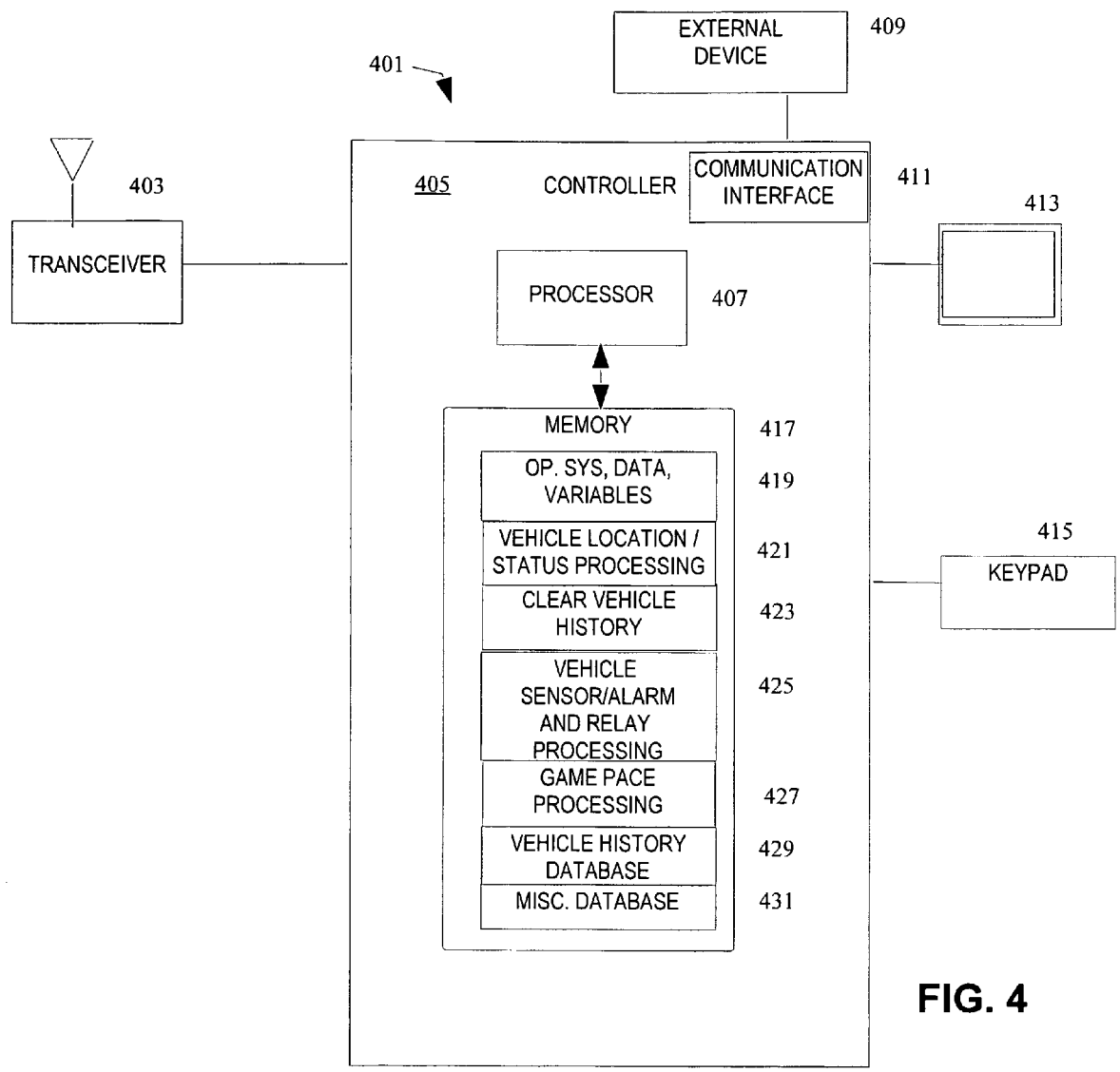
FIG. 4 is a block diagram illustrating portions of an exemplary host computer in accordance with various embodiments.

Referring now to FIG. 4, a block diagram illustrating portions of an exemplary host computer 401 in accordance with various embodiments will be discussed and described. The host computer 401 may include, inter coupled as generally depicted, a controller 405, a transceiver 403, a display 413, and/or a user input device such as the illustrated keypad 415.

The controller 405 further comprises, inter coupled as noted, a communication interface 411 for communication with an optional external device 409 (such as a vehicle tracking device), a processor 407, a memory 417, and various other features that are not further relevant here but which will be understood by those of ordinary skill in the art.

The processor 407 may comprise one or more microprocessors and/or one or more digital signal processors. The memory 417 may be coupled to the processor 407 and can comprise one or more of a read-only memory (ROM), a random-access memory (RAM), a programmable ROM (PROM), and/or an electrically erasable read-only memory (EEPROM). The memory 417 may include multiple memory locations for storing, for example, an operating system, data and variables 417 for managing general execution by the processor 407; computer programs for causing the processor 407 to operate in connection with various functions such as vehicle location/status processing function 421, clear vehicle history function 423, vehicle sensor/alarm and relay processing 425, game pace processing 427, and/or other processing; a database for the vehicle history 429; and/or a database 431 for other miscellaneous information used by the processor 407. The computer programs can direct the processor 407 in controlling the operation of the host computer 401.

According to one or more embodiments, the processor 407 may be programmed for the vehicle location/status processing function 421. For example, the processor 407 can receive communications over the transceiver 403 and/or in accordance with the communication interface 411, where the communications include indications of vehicle location and/or status. The vehicle location and/or status can be stored, for example, in the vehicle history database 429 and/or utilized for further processing, such as the pace processing, represented by the illustrated game pace processing 427, and/or report preparation.

One or more embodiments provide that the processor 407 includes a clear vehicle history function 423. The host computer 401 can transmit a communication to the vehicle tracking device instructing it to clear its memory. The communication can instruct the vehicle tracking device to clear all or part of its memory. This can be useful, for example, to clear the memory after receiving the vehicle history and/or before reinstalling the vehicle tracking device in a motorized vehicle.

The processor 407 can provide vehicle sensor/alarm and relay processing 425, where the host computer 401 can request and/or receive indications of vehicle sensors and/or alarms from a vehicle tracking device, and/or can transmit indications of relay switches for a vehicle tracking device. The relay switch can be instructed to be switched in response to the vehicle's location and/or sensor state. A relay can be associated with an alarm, so that the alarm can be notified. Accordingly, it may be desirable for the vehicle sensor/alarm and relay processing 425 to determine if the alarm should be notified. One or more alarms can be provided. For example, the alarm can be notified where the vehicle history indicates maintenance is due, or velocity/location is outside of a permitted range. Accordingly, one or more embodiments provide that the relay can be associated with an alarm, further comprising determining at least one of the vehicles to which an alarm is to be notified responsive to the vehicle history.

Further accordingly, one or more embodiments provide for first communicating with a plurality of vehicle tracking devices, a respective vehicle tracking device being associated with a respective vehicle, and receiving a vehicle history of vehicle location and vehicle status associated with respective vehicles from the respective vehicle tracking devices; after receiving a vehicle history from at least one of the vehicle tracking devices, the at least one vehicle tracking device having a memory for storing the history, instructing the at least one vehicle tracking device to clear the history from the memory; and second communicating wirelessly with vehicle tracking devices to obtain respective current locations of the respective vehicles; to obtain respective current states of a sensor or an alarm on the respective vehicles; and to instruct a relay on the respective vehicles to be switched responsive to at least one of the current location of the respective vehicles and the current state.

Also, according to alternative embodiments, the processing includes pace processing, represented here by the illustrated game pace processing 427. A procedure for pacing motorized vehicles is discussed in more detail below in connection with FIG. 6.

A user may invoke functions accessible through the user input device 415. The user input device 415 may comprise one or more of various known input devices, such as a keypad, a computer mouse, a touchpad, a touch screen, a trackball, and/or a keyboard.

The display 413 may present information to the user by way of a conventional display, liquid crystal display (LCD) and/or other visual display. The user may invoke functions, such as programming the processor 407 through the user input device 415, which can comprise one or more of various known input devices, such as a keypad 415 as illustrated, a computer mouse, a touchpad, a touch screen, a trackball, and/or a keyboard.

Figure 5:
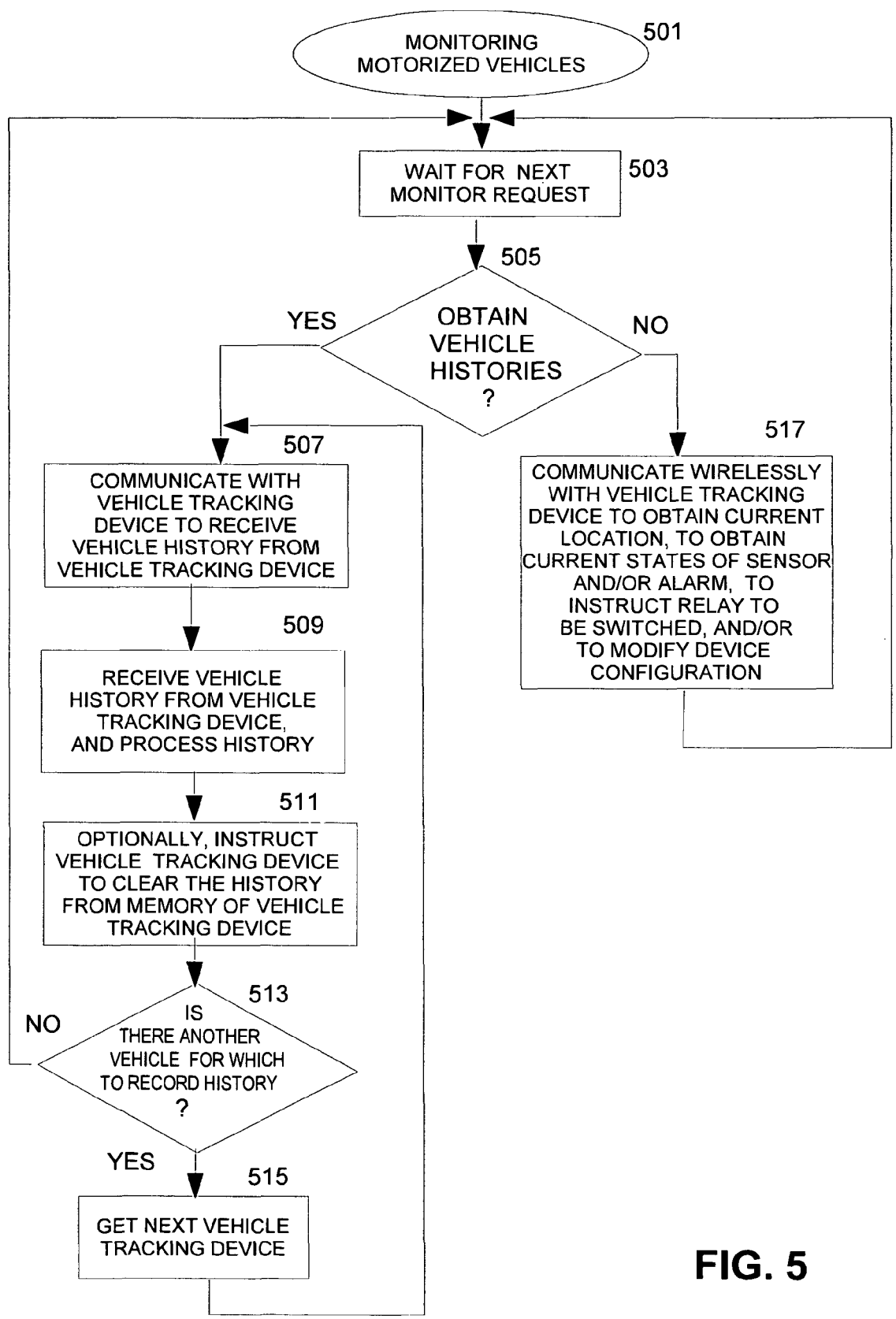
FIG. 5 is a flow chart illustrating an exemplary procedure for monitoring motorized vehicles in accordance with various exemplary and alternative exemplary embodiments.
Figure 6:
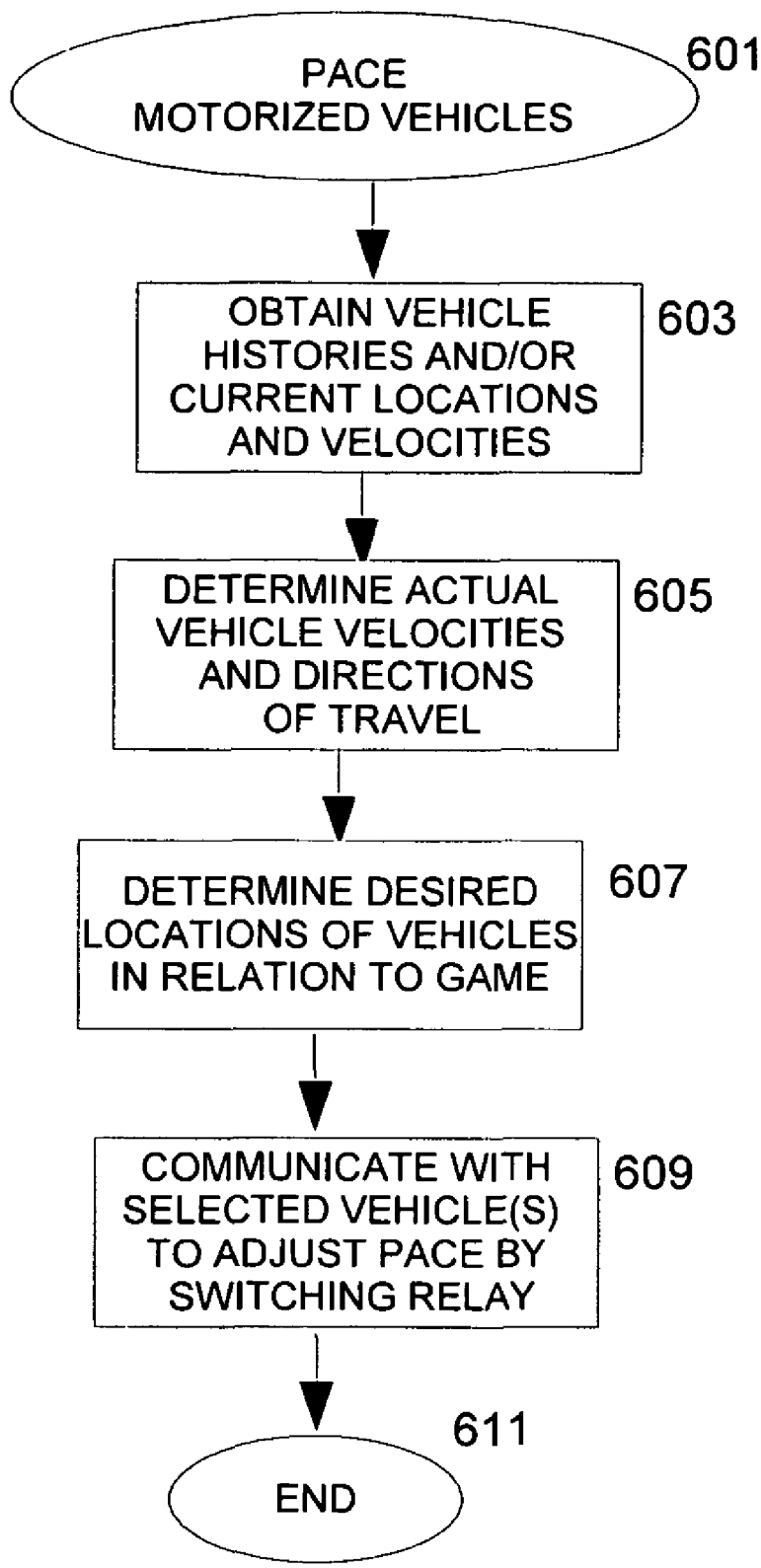
FIG. 6 is a flow chart illustrating an exemplary procedure for pacing motorized vehicles in accordance with various exemplary and alternative exemplary embodiments.
Figure 7:
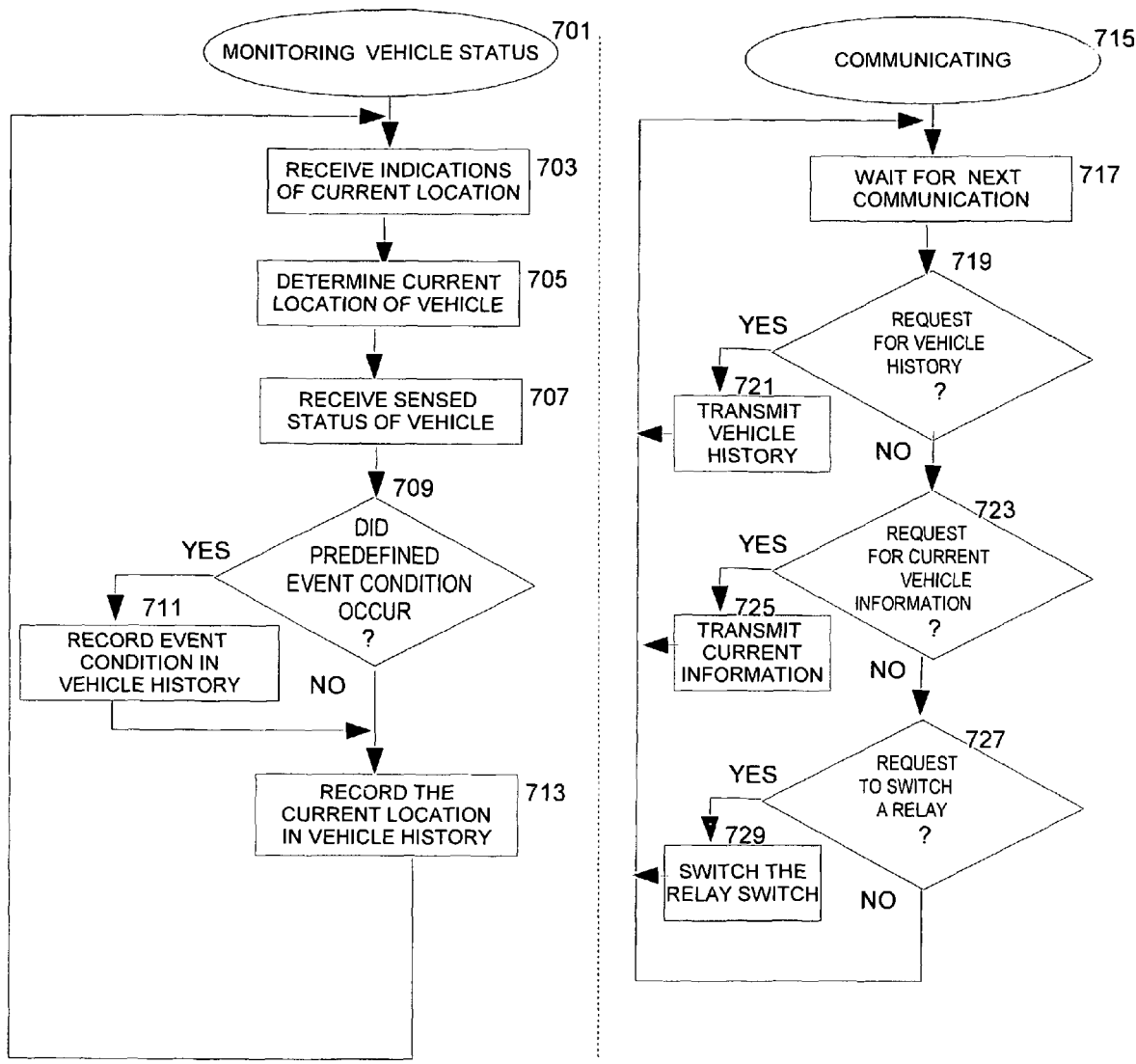
FIG. 7 is a flow chart illustrating exemplary parallel procedures for monitoring vehicle status and communicating, in accordance with various exemplary embodiments.

FIG. 5 and FIG. 6 provide exemplary flow charts of possible embodiments of processes on the host computer, where FIG. 5 illustrates overall process for monitoring of plural vehicles, and FIG. 6 illustrates an optional process for pacing motorized vehicles. FIG. 7 provides an exemplary flow chart of a possible embodiment on a tracking device, which can be installed on a motorized vehicle, where the process is for monitoring the vehicle status and for communicating, such as with the host computer.

Referring now to FIG. 5, a flow chart illustrating an exemplary procedure for monitoring motorized vehicles 501 in accordance with various exemplary and alternative exemplary embodiments will be discussed and described. The procedure can advantageously be implemented on, for example, a processor of a host computer, described in connection with FIG. 4 or other apparatus appropriately arranged.

In overview, the process for monitoring motorized vehicles 501 can include receiving a monitor request 503. If 505 the monitor request is for obtaining vehicle histories, the process can include communicating with the vehicle tracking device to obtain the vehicle history 507, processing the history 509, and optionally clearing the memory of the vehicle tracking device 511. The foregoing can be repeated for additional vehicles 513, 515. Otherwise, the process 501 can provide for communicating 517 wirelessly with the vehicle tracking device to accomplish the requested task. The foregoing is repeated for additional monitor requests. These are described in more detail below.

The illustrated procedure can be implemented for example as a subroutine that receives monitor requests which specify obtaining vehicle histories or alternatively specify obtaining current vehicle information, and include other desirable parameters. Other realizations are possible, and will be appreciated by one of skill in the art. In the illustrated example, the process 501 awaits 503 the next monitor request.

If 505 the monitor request is for obtaining vehicle histories, the process 501 can proceed to transmit 507 a communication to the vehicle tracking device to obtain the vehicle history. The communication can be transmitted in accordance with a computer port interface (if the vehicle tracking device is connected via the computer port interface) or a transceiver (if the vehicle tracking device includes a transceiver).

The process 501 then can wait to receive 509 the vehicle history from the vehicle tracking device. The process 501 can also process the history 509, as described in more detail above. Optionally, the process 501 can instruct 511 the vehicle tracking device to clear the history from the memory. If 513 there is another vehicle for which the history is to be recorded, the process 501 can get 515 the next vehicle tracking device, and can loop to process the next vehicle tracking device. Otherwise, the process 501 can wait 503 for the next monitor request.

The process 501 also provides for communicating 517 wirelessly with the vehicle tracking device to accomplish the requested task. When the monitor request is not for obtaining the vehicle histories 505, the process can communicate wirelessly with the vehicle tracking device to obtain current information, to instruct the vehicle tracking device to switch a relay, and/or to revise the configuration of the vehicle tracking device. The current information that is obtained can be, for example, current location, current states of sensors, current states of alarms, current event conditions, and/or other information that is stored in the vehicle tracking device. The configuration of the vehicle tracking device can be revised, for example, memory format, time, date, event configuration, and/or sensor setup. When done with the communicating, the process 501 can wait 503 for the next monitor request.

Referring now to FIG. 6, a flow chart illustrating an exemplary procedure 601 for pacing motorized vehicles in accordance with various exemplary and alternative exemplary embodiments will be discussed and described. The procedure 601 can advantageously be implemented on, for example, a processor of a host computer, described in connection with FIG. 4 or other apparatus appropriately arranged.

Due to a proceeding (for example, a golf game, a maintenance operation, a snow removal operation), there may be a desired distribution of motorized vehicles. The distribution of the motorized vehicles can be monitored by tracking the vehicle tracking devices installed thereon. The desired distribution may include a desired geographic relation to other motorized vehicles in relation to a proceeding (for example, spacing of golf carts during a golf game, or spacing of lawn mowers during maintenance operations, spacing of snow removal vehicles during snow removal), alone or in combination with a layout of where the proceeding occurs. For example, in a golf game, golf carts associated with a particular party should not be overtaking golf carts associated with a different party. Further it may be desirable to space the golf carts at a sufficient distance from lawn mowers which may be in operation. Similarly, for a delivery operation, it may be desirable to space the delivery vehicles sufficiently apart so as to provide uniform coverage of different delivery zones. A motorized vehicle which is not in range of its desired distribution can have its pace regulated. The pace can be regulated, for example, by limiting a speed, by notifying an alarm, or similar, which can be communicated to the vehicle tracking device as described above.

Therefore, an exemplary procedure 601 for pacing motorized vehicles can include, in overview, obtaining 603 the vehicles' locations, determining 605 vehicles' velocities and directions of travel, determining 607 the desired location in relation to the proceeding, and communicating 609 with selected vehicles to adjust the pace. These are described in some more detail below, keeping in mind that extensive details have already been provided herein.

The process 610 can provide for obtaining 603 the vehicles' locations, for example, by communicating with the vehicle tracking devices that are of concern to obtain current locations, velocities and other relevant information. Alternatively, vehicles' histories can be obtained and the relevant current information can be extracted.

The process 610 can provide for determining 605 vehicle velocities and directions of travel. Given a vehicle's current and previous locations, velocities and directions of travel can be calculated, for example in accordance with known techniques. Alternatively, velocities and directions of travel can be obtained from the vehicle tracking devices.

The process 610 can provide for determining 607 the desired location in relation to the proceeding. For example, the proceeding may have a desired distribution of vehicles, optionally considering possible travel paths in a given location, obstacles, and ranges for locations and preferred separation between vehicles. The desired location, velocity, or similar associated with a particular vehicle can be compared to the reported or calculated location, velocity and direction of travel. The difference between the desired location and the actual location can be calculated. Where there is a sufficient difference between the desire location or the like, the vehicle can be instructed to make an adjustment (such as in a relay) to achieve the desired location, to notify the user via an alarm, or the like.

The process 610 can provide for communicating 609 with selected vehicles to adjust the pace. The communication can be, for example, a relay switch and/or an alarm. Processing can then end 611, for example by returning to the calling procedure. Accordingly, one or more embodiments provides that the locations of the respective vehicles can be determined with respect to a proceeding, or more particularly with respect to a game, and the relay to be switched indicates a desired pace of the respective vehicle in relation to the proceeding or more particularly the game.

Referring now to FIG. 7, a flow chart illustrating exemplary procedures 701, 715 for monitoring vehicle status and communicating, in accordance with various exemplary embodiments will be discussed and described. The procedure can advantageously be implemented on, for example, a processor of a vehicle tracking device, described in connection with FIG. 1 or other apparatus appropriately arranged.

In the illustrated embodiment, there are provided a parallel procedure for monitoring 701 the vehicle status, and for communicating 715, such as with the host computer. Although the parallel implementation can readily handle asynchronous events and asynchronous communications, the process can alternatively be implemented in a serial manner. The process for monitoring 701 vehicle status will be discussed first, followed by a discussion of the process for communicating 715.

The illustrated process for monitoring 701 vehicle status can include looping to perform the following: receiving 703 indications of current vehicle location 703, determining 705 the current location of the vehicle, receiving 707 the sensed status of the vehicle, recording an event condition 709, 711 if a predefined event condition occurred, recording 713 the current location. These are discussed in more detail below.

The process can provide for receiving 703 indications of current vehicle location 703. The indications can be received as signals from the satellite navigation system interface. For example, the indications can be received as GPS records. A typical GPS record provides information indicating latitude and longitude. Other information can also be received with the indications of current vehicle location, such as current time, velocity, and direction of travel.

In addition, the process can provide for determining 705 the current location of the vehicle. Given the indications of current vehicle location, the process can calculate the current location to a parameter that is to be utilized, such as stored in the history and/or forwarded to the host computer. For example, the latitude and longitude can be converted to an address on a particular map, and/or a street address, and/or similar.

Also, the process can provide for receiving 707 the sensed status of the vehicle, such as from the sensors. One or more embodiment can provide for any desired translation of sensed status from the received format to another format, for example a format appropriate for storage.

The process also can include recording an event condition 709, 711 if a predefined event condition occurred. The process can check 709 whether a predefined event condition occurred, for example by checking for an event type, a combination or series of selected event types, a sensor state, a combination of sensor states, a timer value, a particular GPS position data, a threshold or specified run hr-meter value, and/or a threshold or specified accumulated distance, alone or in combination; alternatively in combination with date and/or time, corresponding to an entry in the event configuration (discussed above). Accordingly, one or more embodiments provides that the sensor interface further includes at least one timer, and the sensor interface is configured to facilitate indicating occurrence of a pre-defined event condition responsive to a combination of the sensed status, the at least one timer, and a pre-determined sensor state (for example, active, inactive, don't care). If the predefined event condition occurred, the event condition can be recorded 711 in the vehicle history, together with other desired information such as, by way of example, the information comprising the predefined event condition, the current date and/or time, the current location, the current velocity, and/or the current heading. After recording the event condition information, normal processing can resume.

Thereafter, the process can provide for recording 713 the current location. For example, the determined current location can be stored in the memory. Then, the process 701 can repeat. The process can include a timer so that the storage of the current location occurs at regular intervals. Accordingly, one or more embodiments provides for a timer, wherein the current location is recorded at pre-defined intervals of the timer.

The process for communicating 715 can include waiting 717 for the next communication, and depending on the type of request 719, 723, 727, transmitting 721 the vehicle history, transmitting 725 the current information, or switching 729 a particular relay. Each of these is described in more detail below.

The process can wait 717 to receive the next communication. For example, the communication can be received from the host computer. The communication can include a request, for example, to cause the process to transmit the vehicle history, to transmit the current vehicle information, to switch a relay, and/or other requests, for example to erase memory (not illustrated).

If 719 the request is for a vehicle history, the process can transmit 721 the vehicle history. If 723 the request is for current vehicle information, the process can transmit 725 the current information. If 727 the request is to switch a relay, the process can switch 729 a particular relay indicated in the request. The transmission (if any) can be performed over the same medium that received the request causing the transmission. The process 715 can be repeated, and can wait 717 for the next communication.

Accordingly, one or more embodiments provide for receiving, in accordance with the location interface, an indication of a current location; receiving, in accordance with the sensor interface, the pre-defined event condition; recording the current location in a vehicle history; recording the pre-defined event condition in the vehicle history; receiving a request for vehicle information, and responsive to the request for vehicle information, transmitting the current location and the sensed status.

Instructions for implementing the foregoing can be provided on various computer-readable mediums. Accordingly, one or more embodiments can provide a computer-readable medium comprising instructions for execution by a computer, the instructions for implementing a computer-implemented method for monitoring a plurality of motorized vehicles, and/or a computer-implemented method for real time monitoring of a motorized vehicle. For example, all or part of the instructions can be provided in any appropriate electronic format, including, for example, provided over a communication line as electronic signals, provided on floppy disk, provided on CD ROM, provided on optical disk memory, or the like.

One or more embodiments of the present invention have been illustrated in simplified format. The illustrations are intended as examples, and will be understood to include equivalents. For example, the server can be omitted from the system. Further, it is not intended to limit the present invention to the particular number of vehicle tracking devices or host computers illustrated, or the particular communication networks illustrated. One or more embodiments of the present invention may operate in connection with various other combinations of the same, and/or equivalents thereof.

The vehicle tracking system can utilize communication systems, where the communication systems of particular interest are those providing or facilitating data or messaging services over cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof.

Furthermore the communications of interest may be provided by transceivers, receivers, and/or transmitters that have short range wireless communications capability normally referred to as WLAN (wireless local area network) capabilities, such as IEEE 802.11, Bluetooth, or Hiper-Lan and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the communications of interest may be provided by being connected to a LAN using protocols such as TCP/IP, UDP/UP, IPX/SPX, or Net BIOS via a hardwired interface such as a cable and/or a connector.

The term "satellite navigation system" is used herein to denote various systems that provide positioning information, and are sometimes referred to herein as a "GPS". Such systems include, by way of example, GPS (global positioning system), DORIS (Doppler orbitography and radio-positioning integrated by satellite), EGNOS (European geostationary navigation overlay system), and the like, and equivalents, variants, and augmentations, and other global, regional or national variations thereof. Such satellite navigation systems provide information including position, which may be expressed for example as latitude and longitude, and may provide additional information such as altitude, accurate time, current velocity, current heading, and/or other information. Typically, the information is provided via a receiver that functions to receive the satellite navigation system information, to use the received information to determine a current location of the receiver, and to output an indication of the current location and (optionally) other information, as is understood in this field.

The term host computer is used herein to denote various devices such as a general purpose computer, a personal computer, a handheld and/or portable computer device, or the like, which can utilize wireline and/or wireless communication, for example, modems, cellular telephones, and/or radios to transmit and receive communications. The host computer can communicate with other computers, according to various embodiments. Furthermore the host computers of interest may have short range wireless communications capability normally referred to as WLAN (wireless local area network) capabilities, such as IEEE 802.11, Bluetooth, or Hiper-Lan and the like using, for example, CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (universal Datagram Protocol/Universal Protocol), IPX/SPX (Inter-Packet Exchange/Sequential Packet Exchange), Net BIOS (Network Basic Input Output System) or other protocol structures. According to one or more embodiments, the host computers may be equipped with wireless communication and may be connected to a LAN using protocols such as TCP/IP, UDP/UP, IPX/SPX, or Net BIOS, and/or may be connected via a hardwired interface such as a cable and/or a connector utilizing RS232, USB or other standards.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer-readable medium comprising instructions for execution by a computer, providing a computer-implemented method for monitoring a plurality of motorized vehicles, the instructions for implementing the steps of:
   first communicating with a plurality of vehicle tracking devices, a respective vehicle tracking device being associated with a respective vehicle, and receiving a vehicle history of vehicle location and vehicle status associated with respective vehicles from the respective vehicle tracking devices;

after receiving a vehicle history from at least one of the vehicle tracking devices, the at least one vehicle tracking device having a memory for storing the history, instructing the at least one vehicle tracking device to clear the history from the memory;

determining a desired location and a current location of the respective vehicles with respect to different moving proceedings including a first moving proceeding in which a first plurality of the respective vehicles is participating and a second proceeding which is geographically contiguous to the first proceeding and in which a second one of the respective vehicles is participating, and second communicating wirelessly with vehicle tracking devices to obtain respective current locations of the respective vehicles; to obtain respective current states of a sensor or an alarm on the respective vehicles; and to instruct a relay on the respective vehicles to be switched responsive to at least one of the current location of the respective vehicles and the current state, so as to achieve the desired location of the first plurality of the respective vehicles within the first moving proceeding, and to achieve the desired location of the respective vehicles in the second moving proceeding to avoid overtaking the first moving proceeding, wherein the relay to be switched indicates a desired pace of the respective vehicle in relation to the different moving proceedings.

2. The computer readable medium of claim 1, wherein the respective vehicles include golf carts and the different moving proceedings include different golf games in which the golf carts are participating.

3. The computer readable medium of claim 1, wherein the respective vehicles include lawn maintenance vehicles, and the different moving proceedings include lawn maintenance operations in which the lawn maintenance vehicles are participating.

4. The computer readable medium of claim 1, wherein the respective vehicles include snow removal vehicles, and the different moving proceedings include snow removal operations in which the snow removal vehicles are participating.

5. The computer readable medium of claim 1, wherein the first communicating and the second communicating use a format of a communication predetermined by a portable unitary telemetry/tracking device module removably mounted on the respective vehicles, the portable unitary telemetry/tracking device module includes a transceiver configured to receive the communication, a GPS location interface, and a relay switch for electrical connection to circuits in the vehicle, the communication having an indication whether the relay switch is to be switched.

6. A method for monitoring a plurality of motorized vehicles, comprising:

first communicating, from a host computer, with a plurality of vehicle tracking devices, a respective vehicle tracking device being associated with a respective vehicle; and receiving, at the host computer, a vehicle history of vehicle location and vehicle status associated with respective vehicles from the respective vehicle tracking devices;

after receiving a vehicle history from at least one of the vehicle tracking devices, the at least one vehicle tracking device having a memory for storing the history, the host computer instructing the at least one vehicle tracking device to clear the history from the memory;

determining, at the host computer, a desired location and a current location of the respective vehicles with respect to different moving proceedings including a first moving proceeding in which a first plurality of the respective vehicles is participating and a second proceeding which is geographically contiguous to the first proceeding and in which a second one of the respective vehicles is participating, and second communicating wirelessly from the host computer to the vehicle tracking devices to obtain respective current locations of the respective vehicles; to obtain, at the host computer, respective current states of a sensor or an alarm on the respective vehicles; and to instruct, from the host computer, a relay on the respective vehicles to be switched responsive to at least one of the current location of the respective vehicles and the current state, so as to achieve the desired location of the first plurality of the respective vehicles within the first moving proceeding, and to achieve the desired location of the respective vehicles in the second moving proceeding to avoid overtaking the first moving proceeding, wherein the relay to be switched indicates a desired pace of the respective vehicle in relation to the different moving proceedings.

7. The method of claim 6, wherein the respective vehicles include golf carts and the different moving proceedings include different golf games in which the golf carts are participating.

8. The method of claim 6, wherein the respective vehicles include lawn maintenance vehicles, and the different moving proceedings include lawn maintenance operations in which the lawn maintenance vehicles are participating.

9. The method of claim 6, wherein the respective vehicles include snow removal vehicles, and the different moving proceedings include snow removal operations in which the snow removal vehicles are participating.

10. The method of claim 6, wherein the first communicating and the second communicating use a format of a communication predetermined by a portable unitary telemetry/tracking device module removably mounted on the respective vehicles, the portable unitary telemetry/tracking device module includes a transceiver configured to receive the communication, a GPS location interface, and a relay switch for electrical connection to circuits in the vehicle, the communication having an indication whether the relay switch is to be switched.

* * * * *